United States Patent Office 3,631,159
Patented Dec. 28, 1971

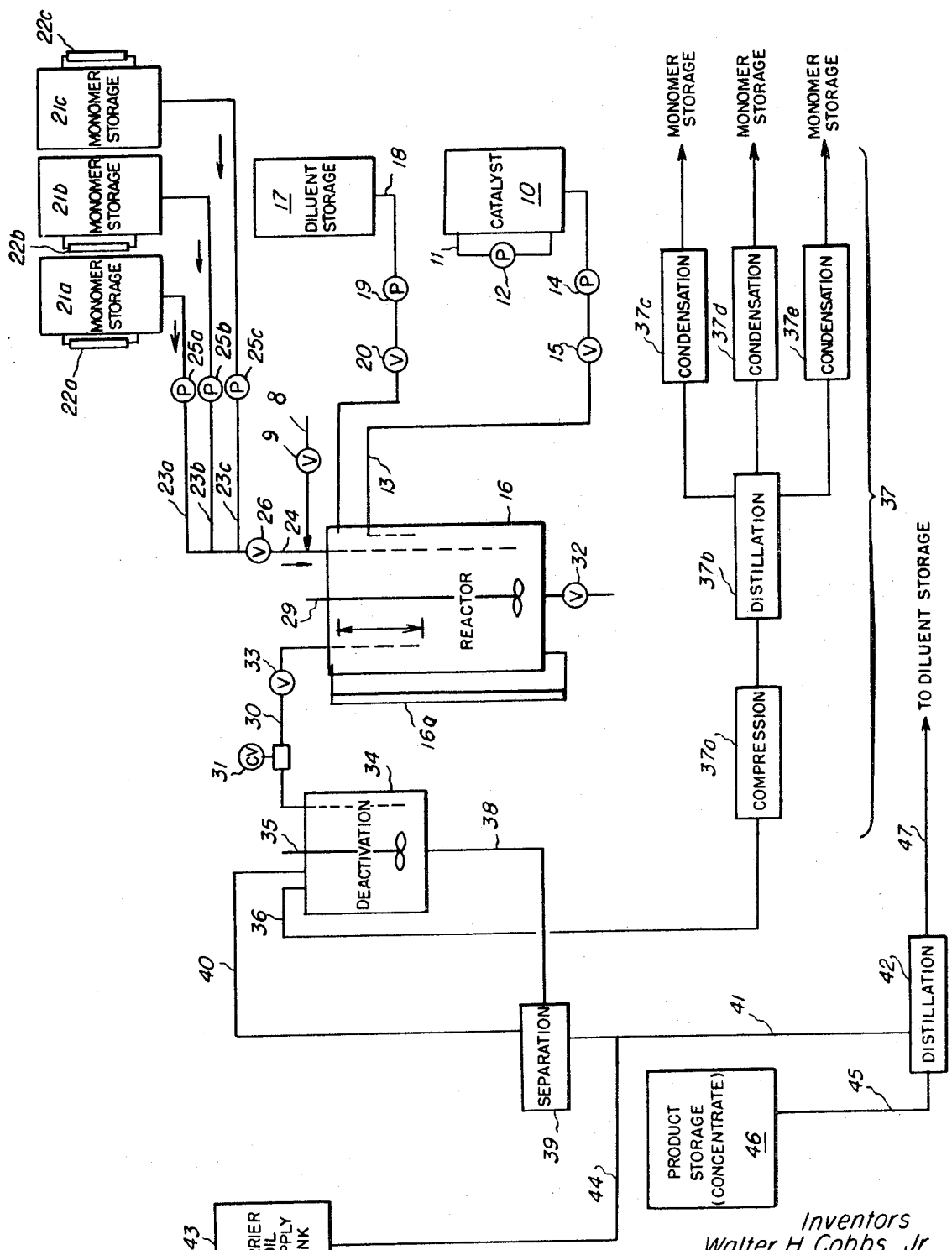

3,631,159
CHEMICAL PROCESS AND PRODUCT
Walter H. Cobbs, Jr., Cincinnati, Ohio, Luther A. R. Hall, Woodcliff Lake, N.J., Roger D. A. Lipman, Yonkers, N.Y., and Thomas H. Shepherd, Hopewell, N.J., assignors to Geigy Chemical Corporation
Continuation-in-part of application Ser. No. 479,416, Aug. 13, 1965. This application Sept. 21, 1966, Ser. No. 580,973
Int. Cl. C08f 15/40
U.S. Cl. 260—80.78    14 Claims

ABSTRACT OF THE DISCLOSURE

Olefin copolymers consisting of residues of at least three different alpha-olefins containing from 3 to 25 carbon atoms have utility as viscosity index improvers. The copolymers have a molecular weight between about 50,000 and about 3,000,000 and an X-ray crystallinity between about 10 and about 50%.

---

This is a continuation-in part of our copending application Ser. No. 479,416, filed Aug. 13, 1965.

This application relates to certain copolymers of alpha olefins which are useful as viscosity index improving additives for oils, to methods for making such copolymers to oil compositions containing said copolymers.

The use of additives to improve the viscosity index of lubricating oils is well-known. Acrylic polymers are often used for this purpose. However, the use of olefinic copolymers for viscosity index improvement has also been suggested. Belgium Pat. 647,517 discloses the use of polymers of one or more alpha olefins in which the polymer chains contain blocks of monomer residues which are sterically or chemically distinct. Such blocks may occur at regular intervals along the polymer chain; or the chains may be heavy in one monomer component at one end with increasing concentrations of a second component toward the other end.

The products of Belgian Pat. 647,517 are made by what are essentially batch techniques. In one such technique the monomers to be used in any batch are all put into a reactor and allowed to polymerize under autogeneous conditions or under conditions which are varied stepwise. In another technique, one monomer or mixture of monomers is polymerized and then a second monomer or monomer mixture is added and polymerized in either the same or a separate reactor. The polymerization conditions are chosen so that one stage will give products of high stereospecificity and the other essentially amorphous sequences.

The process referred to has several drawbacks. In the first place, the polymer product will in general consist of a rather wide range of species differing in molecular weight, structure and physical characteristics. Many of these diverse species are not highly effective as viscosity index improvers, or adversely affect other properties of oils to which they are added, such for example as oil clarity.

Secondly, the process itself, being an essentially batch operation is expensive when carried out on an industrial scale. It is also difficult to insure consistent quality between one batch and the next.

It is an object of the present invention to provide a class of copolymers of alpha-olefins which are particularly well suited for use as viscosity index improver additives for oils.

It is another object of the invention to provide oil compositions incorporating the novel copolymers and having improved viscosity characteristics.

It is a further object of the invention to provide free flowing concentrates of the novel copolymers suitable for addition to oils for viscosity index improvement purposes.

It is anther object of the invention to provide a process for making a lubricating oil viscosity index improver which will be more economical than conventional processes.

It is another object of the invention to provide a method for making a lubricating oil viscosity index improver which will consistently yield a product of high quality free of contaminants.

It is aonther object of the invention to provide a method for making a copolymeric lubricating oil viscosity index improver which will yield a product having a narrow range of component species, with minimal differences in molecular structure, size and physical properties.

It is another object of the invention to provide a polymerization process which will allow recycle and reuse of monomers, diluent and catalyst deactivator.

It is yet another object of the invention to provide a polymerization process of the class described which will achieve a high overall yield of finished product.

Other objects will be apparent from a consideration of the following specification and claims.

In accordance with the invention there is provided a class of random copolymers, capable of being manufactured by a continuous process and having uniformly excellent viscosity index improving capability, comprising residues of two or more alpha-olefins having from three to twenty-five carbon atoms and a third alpha-olefin having from five to twenty-five carbon atoms. Preferably the copolymer will comprise propylene residues, residues of a monomer having 4 to 8 carbon atoms, preferably butene-1, and residues of at least one higher molecular weight alpha-olefin of say 5 to 25 carbon atoms. The polymers are further characterized, and in this are distinguished over the products of the Belgium patent, in that the chemical composition and stereospecific characteristics in each polymer chain are, on the average, the same at the head as they are at the tail and in that sequences of the same chemical composition or stereostructure are arranged along the chains in random fashion.

Polymers of this nature are excellent viscosity index improvers. They are stable to heat and are particularly suitable, for example, in lubricating oils for diesel engines where high temperatures are regularly encountered. They may also be used advantageously to control the viscosity characteristics of functional fluids such as those used in hydraulic motors and the like.

The invention further provide a continuous process capable of consistently producing a copolymeric product having excellent viscosity index improving capability, and comprising a narrow range of component species of high viscosity index improving efficiency,[1] which process also avoids the procedural drawbacks of prior processes.

In its process aspects the invention specifically contemplates a method for making a viscosity index improving additive which comprises feeding a first ethylenically unsaturated monomer having from 3 to 25 carbon atoms into a reaction zone at a constant rate, feeding a second

---

[1] The viscosity index improving efficiency as used here and elsewhere in this specification is the ratio of the specific viscoisty of oil containing the improver at 210° F. to the specific viscosity of the oil containing the improver at 100° F. The specific viscosity is the kinematic viscosity of the solution less the kinematic viscosity of the solvent divided by the kinematic viscosity of the solvent.

ethylenically unsaturated monomer, different from said first monomer and having from 3 to 25 carbon atoms, into said reaction zone at a constant rate, feeding a third ethylenically unsaturated monomer having between about 5 and about 25 carbon atoms and different from said first and second monomers to said zone at a constant rate, feeding a diluent to said reaction zone at a constant rate, feeding a low pressure catalyst to said reaction zone, copolymerizing said monomers in said zone, and continuously removing copolymer and unreacted monomer from said zone at a rate such as to maintain a mass balance between monomers fed and monomers and polymers withdrawn from said zone. The unreacted monomers are preferably recycled to feed.

The first and second monomers which may be used in the invention may, in general, be any ethylenicaly unsaturated compounds having from 3 to say 25 carbon atoms. Desirably the feed will contain as the first monomer component a substantial proportion of propylene, preferably at least 10% by weight. The second monomer component is desirably another unsaturated compound of higher molecular weight. As well as normal alpha-olefins of 4 to 25 carbon atoms this may include singly or double branched chain olefins such as 3-methyl-butene-1 and 4:4 dimethyl pentene-1 as well as aromatic alpha-olefins such as styrene and cycloaliphatic alpha-olefins listed in Reding et al., U.S. Pat. No. 3,091,601. Non-conjugated dienes such as 1:6 heptadiene which can form linear polymers having cyclic structures by the intra-molecular intermolecular mechanism described by C. S. Marvel and J. K. Stille (JACS 80 1740 (1958)) may also be employed.

Most preferably the first and second monomer components are alpha-olefins of 3 to 8 carbon atoms.

Processes in which two ethylenically unsaturated monomers are copolymerized, are disclosed and claimed in our copending application Ser. No. 581,053, filed concurrently herewith. In some instances the products obtained using only two monomer units have relatively low oil solubilities, so that it is difficult to prepare oil concentrates having high proportions of additives. Such concentrates are a conventional mode for merchandising additives.

As indicated above, in the present process a third olefin component is used. Where the first two monomer components are of relatively low molecular weight, e.g. $C_3$ to $C_8$ olefins, the effect of the third component is in general to increase the oil solubility of the additive making merchantable concentrates easier to prepare. By using a relatively high molecular weight olefin as the third monomer, pour point depression may also be imparted.

The third olefin component will be an alpha olefin having from 5 to say 25 carbon atoms. Mixtures of several olefins may be used. Thus, for example, a mixture of $C_6$ to $C_{10}$ olefins has been found highly satisfactory. A mixture of $C_{11}$ to $C_{18}$ olefins has been found especially useful where pour point depression is required.

The ratios of monomers may vary widely depending on the particular monomers used, the reaction conditions and the properties required in the finished product. In general, no single monomer will comprise more than 90% by weight of the total monomer fed. The products will preferably contain 10–90% by weight $C_3$–$C_8$ residues.

Particularly preferred combinations of monomers include combinations containing propylene or butene-1.

Propylene is advantageously used in proportions of between about 10 and about 90% of the total monomer. Butene-1 may also advantageously comprise between about 10 and 90% by weight of total monomer fed.

Especially advantageous combination of monomers use propylene with a $C_4$–$C_8$ alpha olefin, especially butene-1 and as a third higher molecular weight component, a $C_5$–$C_{25}$ alpha olefin. In such combinations, the proportions will in general be as follows (percent by weight):

| | |
|---|---|
| Propylene | 10–90 |
| $C_4$–$C_8$ olefin | 9–80 |
| $C_5$–$C_{25}$ | 1–40 |

This will in general result in a product containing, percent by weight:

| | |
|---|---|
| $C_3$ residues | 10–90 |
| $C_4$ to $C_8$ residues | 9–70 |
| $C_5$–$C_{25}$ residues | 1–30 |

Most preferably the monomer proportions will be as follows, percent by weight

| | |
|---|---|
| Propylene | 19–80 |
| Butene-1 | 19–80 |
| $C_5$–$C_{25}$ olefin | 1–20 |

This will in general give a product containing percent by weight:

| | |
|---|---|
| $C_3$ residues | 20–80 |
| $C_4$ residues | 10–70 |
| $C_5$–$C_{25}$ residues | 1–15 |

It will be appreciated that as a practical matter olefins, particularly olefins $C_5$ and higher, are sold as mixtures of two, three or more individual compounds. Such mixtures are wholly satisfactory as the source of the second or third monomer component.

The catalysts used in the process according to the invention may be any of those commonly referred to as "low pressure" catalysts. These include, for example, chromium oxide or mixtures of chromium oxide and strontium oxide supported on a silica, alumina, silica-alumina, zirconia or thoria bed;[2] nickel or cobalt supported on charcoal[3]; and molybdenum oxide supported on alumina[4]. Of particular interest are the Ziegler or Ziegler-Natta catalysts.

As is well known, Ziegler catalysts are prepared from two components, the first of which is an organometallic compound or a metal hydride in which the metal is chosen from Groups I to III of the Periodic Chart of the Elements.[5] Examples of such compounds are triethylaluminum, tri-isobutyl aluminum, tri-n-propyl aluminum, diethyl aluminum chloride, diethyl aluminum hydride diethylberyllium, phenyl lithium, and lithium hydride. The preferred compounds are diethyl aluminum chloride and triethyl aluminum.

The second component of the Ziegler catalyst is a compound of a metal of Groups IV to VIII of the periodic Chart of the Elements, preferably a compound of a metal of Groups IV to VI. Halides or oxyhalides are advantageously employed. Examples of suitable compounds include, vanadium tetrachloride, vanadium trichloride vanadyl trichloride, titanium tetrachloride, titanium trichloride, titanium tetrafluoride and tungsten hexachloride. Titanium trichloride is generally preferred.

The molecular ratio of the organo-metallic compound (the first component) to the metal compound (the second component) in the Ziegler catalyst may vary widely, from say 0.1 to 10 or more. The ratio is not critical, but for economy, ratios of say 1 to 5 are preferred.

The proportion of catalyst to monomer is again not a critical factor. Indeed since the role of the composition in question is that of a catalyst or initiator, any proportion can be used, though, of course, excessively small proportions will give low conversions and to use excessive

---

[2] See U.S. Pat. 2,825,721.
[3] See U.S. Pats. 2,658,059; 2,692,261; 2,692,295; 2,717,888 and 2,717,889.
[4] See U.S. Pats. 2,692,257; 2,692,258 and 2,780,617.
[5] The version set out at pages 448–9 of the Handbook of Chemistry and Physics, 43rd edition, 1961–2, published by the Chemical Rubber Publishing Company is referred to.

amounts is wasteful. Usually 0.0001 to 0.01 mol of catalyst, per mol of olefin is used, based on the organometallic (first) component, in the case of a Ziegler catalyst.

Ziegler catalysts can be made more active by pretreating them with an alpha-olefin having 4 to 20 carbon atoms, such, for example, as octene-1, prior to the copolymerization process. Such preactivation is normally carried out at 25 to 60° C. in the absence of air, for say 4 to 10 hours.

The process according to the invention is normally carried out in the presence of a liquid diluent. The diluent may be any organic solvent inert to the monomers and catalyst components. Aliphatic paraffinic hydrocarbons, cycloparaffins or aromatic hydrocarbons may be used. The preferred diluent is cyclohexane.

In carrying out the invention, using a Ziegler catalyst, the two components of the catalyst are added to the diluent. Usually the first component, e.g., $Al(Et)_2Cl$, is added to the diluent followed by the second component, e.g., $TiCl_3$, to form a slurry. The reverse order may be followed, however, if desired.

The monomers, diluent and catalyst slurry are all introduced, in the absence of air, into a reaction zone, which is normally in a pressure vessel equipped with suitable temperature control, i.e., heating or cooling equipment.

The precise reaction conditions maintained in the reaction zone will be governed by the character of the monomer feed and by the qualities desired in the product. Moreover, the temperature, pressure and contact time will be interrelated.

Broadly speaking, the reaction temperature will range from about 20° C. to about 200° C. Pressure will be from about 0 p.s.i.g. to about 3000 p.s.i.g. Preferably, though not necessarily, the pressure in the reactor should be adjusted to a value such that the reactor remains full of liquid under operating conditions. For any given conditions of temperature and pressure, the reaction time should be such as to give a single cycle conversion of monomers between about 5 and about 90%, normally between about 30 and about 90%.

There is a close relationship between the degree of conversion, reaction temperature, proportions of monomer in the feed and viscosity index improving efficiency. If the proportion of volatile monomer, e.g. propylene, is increased, the degree of conversion must be increased to get the same viscosity index improving efficiency at a given reaction temperature. Bearing these factors in mind, reaction times will, as noted, generally give a conversion of the most volatile component of 5 to 90%, preferably 30 to 90%. Usually this will correspond to 0.5 to 6 hours, and in the preferred case, 1 to 4.5 hours.

The polymers of this invention have intrinsic viscosities as determined in decalin at 115° C. (Huggins J. Am. Chem. Soc. 64, 2716 (1942)) from 0.50 to 4.74 [6] or even higher, corresponding to molecular weights of 50,000 to 3,000,000 or higher. Viscosity index improving ability is generally independent of molecular weight and hence intrinsic viscosity.

As indicated above, the polymers are made with stereospecific catalysts. However, they are largely soluble in n-heptane. Their crystallinity by X-ray techniques [7] is between about 10 and about 50%, preferably 20 to 35%.

Because the polymers are made under conditions which are substantially constant with time, each addition to the growing polymer chain is made under precisely the same conditions as each preceding addition. Hence, the probability of any particular monomer component being added is the same at every instant of time. Under these conditions the chemical composition and stereostructure are, on the average, the same at the beginning, at the end and along the length of each polymer chain and monomer sequences are arranged in wholly random fashion.

It will be appreciated that this arrangement is wholly different from either (a) block copolymers (properly so-called); or (b) copolymers made under batch conditions. In true block copolymers, one monomer component is allowed to polymerize to give chains of a certain length. Excess monomer is then removed and, while the chains retain their activity, a second monomer is introduced. This may be repeated to give chains having alternate A and B blocks arranged in more or less regular sequence along the chain. While it is conceivable that the head of such chain could, on the average, be the same as the tail, the monomer sequences along the chain would not be randomly disposed.

On the other hand, if a mixture of monomers is placed in a reactor, the more reactive monomer (or the one in highest concentration) will react at first more extensively than the others. As this component is converted, however, its concentration as monomer decreases and the degree to which it joins the growing polymer molecule falls off. The result is chains which are heavy with one constituent monomer residue at one end and with a different residue at the other. Such chains do not have one end, on the average, the same as the other, as do the products of this invention.

The invention comprises a mixture of copolymers described above with oils. In most use concentrations the copolymer will constitute a minor amount of the mixture, on the order of 0.1 to 30%, preferably 0.3 to 10% and most preferably 0.5 to 2.5% by weight. However, in accordance with conventional practice the copolymer is normally merchandised as a concentrate in a carrier oil such, for example as a 55 U.S. naphthenic oil, the concentrate containing between about 10 and about 40% by weight of the copolymer.

The invention finds its chief utility in regulating the viscosity of hydrocarbon lubricating oils which may, of course contain other additions such as pour point depressants. It is also valuable when applied to hydrocarbon functional fluids used as power transmittion media and the like and can be employed to regulate the viscosity of oils other than hydrocarbon oils, such, for example, as high molecular weight esters.

In formulating oil concentrates as described above, it is found that in some instances the molecular weight of the polymer is so high that the concentrate does not flow easily. This difficulty can be remedied by a post polymerization shear treatment of the type described in the copending application of Max W. Meyer, Ser. No. 528,776, filed Feb. 21, 1966; or by conducting the polymerization in the presence of hydrogen. Where hydrogen is used, it may be introduced to the polymerization reactor as a separate stream or with the monomer or catalyst stream, as desired. In general between about 0.0001 and about 0.004, preferably between about 0.0004 and about 0.002 mol of $H_2$ per mol of monomer is used.

The invention will be more fully described with reference to the accompanying drawing which is a schematic representation of a system for carrying out the process according to the invention.

Referring to the drawing, a low pressure catalyst, such as a Ziegler catalyst, for example $Al(Et)_2Cl$ with $TiCl_3$, is mixed with an inert solvent such as cyclohexane in a reservoir 10 to form a slurry. The slurry may be maintained uniform in composition by continuously recirculating it through the pipe 11 by means of a pump 12.

As noted above, the catalyst may be pretreated with an olefin such as octene-1 over a period of time (say 4 to 1 hours). For the sake of simplicity, the necessary arrangements have not been shown on the drawing.

Slurry from reservoir 10 is delivered through line 13, pump 14 and valve 15 to a reactor 16. The reactor 16 is

---

[6] Intrinsic viscosities given here and elsewhere in this application are in deciliters/gram.
[7] General techniques for determining crystallinity by X-ray methods are disclosed by Hermans and Weidinger in Makromolecular Chemie, 44, 24–36 (1961). A more specific procedure, and that upon which the present values are based is decribed by A. Turner Jones in Polymer, 6, 249 (1965).

a pressure resistant vessel made of a meterial inert to the reactants and catalyst under the conditions of the reaction. It will be furnished with cooling or heating equipment or both for controlling the temperature of the reaction. Such equipment, which is wholly conventional, is not shown in the drawing for the sake of simplicity. The pump 14 is a metering device of conventional construction and delivers a constant mass flow of slurry from reservoir 10 to the reactor 16.

Diluent is drawn from reservoir 17 and fed via line 18, pump 19 and valve 20 to the reactor 16. Again pump 19 is selected for its capability to meter precise quantities of liquid so that a given mass delivery rate to reactor 16 can be maintained. Normally from 3 to 8 liters of diluent are used, per kilogram of monomer feed. This is divided between the slurry and direct feed from reservoir 17. Division between these two routes is by no means critical but it is usually convenient to furnish about half the diluent in the slurry and about half directly.

Liquid monomers are stored in the tanks 21a, 21b and 21c. Sight glasses 22a, 22b and 22c may be provided to check the level of monomers in the tanks. The monomers are delivered through lines 23a, 23b and 23c, pumps 25a, 25b and 25c and mixing valve 26 and line 24 to the reactor 16. Pumps 25a to c are again metering devices permitting accurate delivery of monomers to the reaction zone at the desired mass rate. The line 24 terminates in the bottom of reactor 16.

Instead of delivering monomers from separate tanks such as 21a, b and c, to the reactor, a mixture of monomers previously prepared may be stored in a single tank, e.g., 21a, and delivered from there to the reactor. Hydrogen may be furnished to the reactor 16 through line 8 and valve 9.

A stirrer 29 is provided in reactor 16 to maintain proper mixing of the reactants, catalyst and diluent.

Overflow consisting of polymer, diluent, catalyst and unreacted monomer is removed from the reactor 16 through line 30. The line or pipe 30 terminates below the liquid level as shown in the drawing. A sight glass 16a serves to indicate the liquid level in the vessel.

A pressure regulator 31 is located in line 30 to maintain proper pressure in reaction vessel 16. When it is desired to empty the reactor valve 32 is opened to permit the pressure in the reactor to empty it.

The exit line 30 discharges into a tank 34 having a stirrer 35. The tank 34 contains a catalyst deactivator such as methanol or ethylene glycol, in the case of a Ziegler catalyst, to deactivate the catalyst and halt the polymerization. Unreacted monomers may be removed from tank 34 via line 36 and sent to a recovery facility, indicated generally at 37. Here the monomers may be compressed at 37a and subjected to distillation at 37b to separate them into the appropriate components which may be condensed at 37c, 37d and 37e. The condensed monomers may then be recycled to their feed tanks 21a–c.

A mixture of product, spent catalyst, diluent and catalyst deactivator is removed from the bottom of tank 34 through line 38. This may be separated in a separation plant 39. Catalyst deactivator may be recycled to the tank 34 through line 40.

A solution of product in diluent is withdrawn from separation plant 39 through line 41. It has been noted above that the viscosity index improver made according to the invention is conventionally marketed as a concentrate in a carrier oil. According to the invention such concentrate may be made by drawing carrier oil stored in tank 43 through line 44 and mixing it with the solutions flowing through line 41. The mixed stream is then sent to a distillation facility 42 where diluent is separated from polymer product and carrier oil. The diluent may be returned to storage via line 47. The concentrate of polymer product in carrier oil is stored in tank 46.

By appropriate recycling such as has been described some 90–100% of monomer can be converted to final product.

Any of the known type oils are suitable for improvement by the products of the present invention including petroleum oils and synthetic oils. The oils may also contain conventional additives such as dispersing aids, pour point depressants, anti-oxidants and detergents.

The invention will be further described with reference to the following specific examples which are intended to be illustrative only and are not intended to limit the invention which is defined in the claims appended hereto.

EXAMPLE I

To a slurry of 22.2 g. of $TiCl_3 \cdot \frac{1}{3} AlCl_3$ in 15.08 liters of cyclohexane, predried over silica gel, containing 28.2 ml. of diethyl aluminum chloride was added 67.9 g. of $C_{12-16}$ alpha-olefin. This mixture was circulated through a closed loop for 16 hours using a diaphragm pump under a nitrogen atmosphere. The activity of the titanium trichloride catalyst was enhanced by the action of the $C_{12-16}$ alpha-olefin resulting in higher catalyst efficiency. The activated catalyst slurry was then added to a one gallon autoclave under a dry nitrogen atmosphere at a rate per hour of 0.74 g. $TiCl_3 \cdot \frac{1}{3} AlCl_3$, 0.94 ml. diethyl aluminum chloride and 505 ml. of cyclohexane diluent with 4.5 g. of $C_{12-16}$ alpha-olefin per liter of diluent. Half the cyclohexane was normally added with the catalyst and half with the monomers. The autoclave was fitted with an electric jacket heater, a pressure gauge, turbine stirrer, two inlet tubes reaching to near the stirrer—one for catalyst addition and the other for monomer addition, a thermocouple and an outlet in the lid of the clave. The outlet led to a back pressure regulator which would be set for any desired pressure. The stirrer in the clave was turned on as catalyst was added and the clave was heated to 84–85° C. After the clave was approximately half full, the solution of predried monomers in predried cyclohexane was added at a rate of 305 g. monomer and 500 ml. cyclohexane per hour. The monomer ratio was, in weight per cent, propylene 42%, butene-1 46% and $C_{12-16}$ alpha-olefin 12%. The clave soon became full and the pressure rose to 640–680 p.s.i.g. as set by the back pressure regulator. The pressure is in excess of the vapor pressure of propylene at 85° C. The concentration of polymer in the effluent cyclohexane solution gradually increased till a steady state condition existed in the polymerization reactor after some 6–10 hours of operation. Under steady state conditions, the monomer feed concentration was 28 wt. percent and the catalyst feed concentration was 0.21 wt. percent. The polymer concentration as formed was about 10 wt. percent. The average residence was 2.56 hours and the single cycle monomer conversion was 34%. On this basis the catalyst efficiency was 141 g. polymer/g. catalyst. A materials balance confirmed that the rate of withdrawal of polymer and unreacted monomer was substantially equal to the rate of monomer feed. The effluent polymer solution containing still active catalyst as seen by the pinkish purple color was treated with a small amount of methanol or ethylene glycol to discharge the color and deactivate the residual catalyst. A measured portion of the cyclohexane solution was then diluted with isopropanol to precipitate the polymer. The isolated polymer was carefully washed with methanol, vacuum dried and weighed. In an hour period, 103.7 g. of polymer representing a single cycle monomer conversion of 34%, were obtained.

The polymerization was carried on for a period of 20 hours at steady state conditions. Infrared analysis of the product indicated a chemical composition of (in weight percent) propylene 66.0%, butene-1 27.0% and $C_{12-16}$ olefin 7.0% (that is, 72 mol percent propylene). The polymer had an intrinsic viscosity of 2.49, and an X-ray crystallinity of 30%. The polymer had 3.8% insolubles in n-heptane at 60° C.

The cyclohexane solution from the 20 hours of operation was separated from the deactivator and transferred to a distillation vessel; 8296 g. of 55 S.U.S. naphthenic oil was added. Cyclohexane diluent was distilled off until the flash point of a sample removed from the vessel rose to 260° F. The final product consisting of a 20% by weight concentrate was removed from the vessel and transferred to storage.

The 20% concentrate was added to a multigrade crankcase oil (Texaco TL5499) to give a 0.9 weight percent polymer solution. The resulting oil with additive was clear at room temperature. It showed a viscosity index efficiency of 1.34 with a viscosity index of 144.

EXAMPLE II

Example I is repeated in respect to procedure, equipment and catalyst but with $C_{16-20}$ alpha-olefin being used instead of $C_{12-16}$ alpha-olefin. 5.8 g. of $C_{16-20}$ alpha olefin were used per liter of diluent for activation of the catalyst. The catalyst efficiency in this case was 186 grams of polymer formed/gram of catalyst used. The polymerization was carried out with a residence time of 2.82 hours with a single cycle monomer conversion of 36.2% at steady state conditions over a period of 10 hours. In an hour period 112 g. of polymer were formed having an average chemical composition as seen by infrared analysis of (in weight percent) propylene 54%, butene 41%, and $C_{16-20}$ alpha-olefin 5%. The polymer was of high molecular weight with an intrinsic viscosity of 1.78 and an X-ray crystallinity of 28%.

A 0.75 weight percent solution of this polymer in TL5499 base oil showed a viscosity of 10.96 centistokes at 210° F. and a viscosity index efficiency of 1.57 and a viscosity index of 151. The oil solution was clear at room temperature.

EXAMPLE III

Polymerization was effected in the general manner described in Example I. A slurry containing 0.461 gram of $TiCl_3 \cdot \frac{1}{3} AlCl_3$, 0.585 ml. of diethyl aluminum chloride in 445 ml. of cyclohexane was added to the polymerization each hour over the entire run of 40 hours. There was no activation of the catalyst in this case with alpha-olefin. The monomer feed was (by weight) propylene 45%, butene-1 49% and octene- 6%. The polymerization was carried out at a temperature of 98–102° C. and a pressure of 680–720 p.s.i.g. The residence time was 3.07 hours with a single cycle monomer conversion of 22.3%. In each hour period, 49 grams of polymer were prepared having a chemical composition (by weight) propylene 64%, butene-1, 34.2% and octene-1, 1.8%. The catalyst efficiency was 84.8 g. polymer/g. catalyst used. The polymer had an intrinsic viscosity of 1.54 and a relative X-ray crystallinity of 28%. Careful fractionation of the polymer indicated that 25% of the polymer had an intrinsic viscosity of under 0.95 while 50% of the polymer had an intrinsic viscosity of 1.70±0.08. This split represents a crude polymer containing a component with a fairly narrow molecular distribution and another component with a large low molecular weight tail. A fraction of 0.1 weight percent polymer was insoluble in heptane at 60° C.

A 1.20 weight percent solution of this polymer in TL5499 gave a clear solution at room temperature with a solution viscosity at 210° F. of 11.42 centistokes. This means a viscosity index efficiency of 1.37 and a viscosity index of 146.

EXAMPLE IV

Example III was repeated at a higher monomer feed concentration (330 g./hours vs. 220 g./hours) and with preactivation of the catalyst with octene-1 (1.3 grams octene-1 per liter of catalyst slurry). The monomer feed composition was (by weight) propylene, 45.5%, butene-1, 48.5% and octene-1 6%. The residence time was reduced to 2.34 hours and the polymerization carried out at steady state conditions for 25 hours. The single cycle monomer conversion was 20.6 percent with a catalyst efficiency of 129 g. polymer/g. catalyst. In each hour period, 68 g. of polymer were obtained with an average chemical composition of propylene 58.8%, butene 38.7% and octene 2.5%. The materials balance observed at steady state conditions was 98%. The polymer had an intrinsic viscosity of 1.57 and an X-ray crystallinity of 32%.

A 1.10 weight percent solution of the polymer gave a clear solution in TL5499 at room temperature and a solution viscosity at 210° F. of 11.47 centistokes. This corresponds to a viscosity index efficiency of 1.39 and a viscosity index of 146. The shear stability of the polymer was measured as 29 percent solution viscosity loss after sonic shearing at 70° C. for 10 minutes.

EXAMPLE V

The polymerization was carried out according to Example I except that a higher catalyst concentration was used. In this case 1.4 g. $TiCl_3 \cdot \frac{1}{3} AlCl_3$, 1.8 ml. of diethyl aluminum chloride slurried in 930 ml. of cyclohexane were added to the polymerization system each hour. The residence time was kept lower than in Example I, 1.625 hours, in an attempt to reduce polymer molecular weight. The polymerization was carried out at a single cycle monomer conversion of 40 percent with a catalyst efficiency of 84 g. polymer/g. catalyst. The polymer had an intrinsic viscosity of 2.07 and an X-ray crystallinity of 34%. About 1% of the whole polymer was insoluble in heptane at 60° C. The chemical composition of the polymer as seen by infrared was (by weight) propylene, 60.3%, butene-1, 33.2%, and $C_{12-16}$ alpha-olefin, 6.5%.

1.00 percent solution of the original whole polymer in TL5499 gave a clear solution at room temperature and a 210° F. solution viscosity of 11.44 centistokes. This coincides to a viscosity index efficiency of 1.37 and a viscosity index of 146.

EXAMPLE VI

Example I was essentially repeated at a temperature of 70–71° C. and 400 p.s.i.g. pressure with a catalyst feed per hour of 0.578 g. $TiCl_3 \cdot \frac{1}{3} AlCl_3$, 0.73 ml. of diethyl aluminum chloride in 490 ml. cyclohexane. The catalyst was activated using 4.5 g. of $C_{12-16}$ alpha-olefin per liter catalyst slurry. A monomer feed composition of (by weight) propylene, 40%, butene-1, 50% and $C_{12-16}$ alpha-olefin, 6%. The residence time was 2.6 hours and the single cycle monomer conversion was 35.9%. The catalyst efficiency was 122 g. polymer/g. catalyst. There were 110 g. of polymer formed each hour during the steady state polymerization of some 8 hours. The polymer had an average chemical composition (by weight) propylene, 77.4%, butene 18.1% and $C_{12-16}$ alpha-olefin, 4.5%. It had an intrinsic viscosity of 2.46 and an X-ray crystallinity of 45%.

A 0.5 weight percent solution of the polymer in TL5499 gave a clear solution at room temperature and a 210° F. solution viscosity of 9.48 centistokes. This corresponds to a viscosity index improving efficiency of 1.59 and a viscosity index of 147.

EXAMPLE VII

Example I was essentially repeated using a feed of 0.573 g. $TiCl_3 \cdot \frac{1}{3} AlCl_3$ catalyst, 0.727 ml. diethyl aluminum chloride cocatalyst, 1307 ml. cyclohexane solvent and 267 g. of monomer per hour. The monomer feed composition was (by weight) propylene, 46%, butene-1, 48% and $C_{12-16}$ alpha-olefin, 6%. The polymerization was carried out at a temperature of 78–85° C. and a pressure of 680–720 p.s.i.g. with a residence time of 2.2 hours and single cycle monomer conversion of 30.5%. The catalyst was activated with alpha-olefin (2.25 g./liter catalyst slurry) and had an efficiency of 116 g. polymer/g. catalyst. The chemical composition of the polymer formed was, by weight, propylene, 60.4%, butene, 36.2% and $C_{12-16}$ alpha-olefin, 3.4%. The polymer had an intrinsic viscosity of 1.60 and an X-ray crystallinity of 31%.

A 10 weight percent solution of the polymer (equivalent to a 0.34 weight percent solution of the $C_{12-16}$ portion of the whole polymer) in TL5499 exhibited a pour point of −24° F.

A 1.2% solution of the polymer in TL 5499 gave a clear solution at room temperature and a 210° F. solution viscosity of 11.39 centistokes. This is a viscosity index efficiency of 1.35 and a viscosity index of 146.

EXAMPLE VIII

Example VII was repeated using a feed of 0.965 g. $TiCl_3 \cdot \frac{1}{3} AlCl_3$ catalyst, 1.225 ml. diethyl aluminum chloride cocatalyst, 1170 ml. cyclohexane diluent and 238 g. of monomer per hour. The monomer feed composition was, by weight, propylene, 46%, butene-1, 48% and octene-1, 6%. The catalyst was not activated with octene and the catalyst efficiency was only 65.5 g. polymer/g. catalyst. The single cycle monomer conversion was 31%. The chemical composition of the polymer formed was, by weight, propylene, 64.4%, butene, 33.4% and octene, 2.2%. The polymer had an intrinsic viscosity of 1.64 and an X-ray crystallinity of 33%.

A 1.1 percent solution of the polymer in TL5499 gave a clear solution at room temperature and a 210° F. solution viscosity of 11.74 centistokes. This corresponds to a viscosity index efficiency of 1.29 and a viscosity index of 145. The viscosity loss on the sonic shear test of this solution at 70° C. for 10 minutes was 33%.

EXAMPLE IX

Example IV was repeated with a feed of catalyst 0.55 g. $TiCl_3 \cdot \frac{1}{3} AlCl_3$, 0.697 ml. diethyl aluminum chloride, diluent 1091 ml. cyclohexane, and monomer 255 g. per hour. There was no activation of the catalyst. The monomer feed composition, was, by weight, propylene, 46%, butene-1 48% and octene-1 6%. The residence time was 2.56 hours with a single cycle monomer conversion of 24.1% and a catalyst efficiency of 107 g. polymer/g. catalyst for a steady state polymerization of 35 hours. A materials balance was measured at 100% at steady state conditions. The polymer isolated had an average chemical composition by weight, of propylene, 63.5%, butene, 34.5% and octene, 2.0%. It had an intrinsic viscosity of 1.86. The relative X-ray crystallinity was 26%. A fractionation of this polymer indicated a mixture of polymers ranging from polymer with an intrinsic viscosity of under 0.50 with a 59% butene content, to polymer with an intrinsic viscosity of 2.47 with a 10% butene content. 40% of the whole polymer had a viscosity index efficiency of 1.30 or higher while 95% of the whole polymer had a viscosity index efficiency of 1.17 or better.

A 1% solution of the polymer in TL5499 gave a clear solution at room temperature and a 210° F. solution viscosity of 11.33 centistokes. This is equivalent to a viscosity index efficiency of 1.42 and a viscosity index of 147. This solution in TL5499 underwent a 34% loss in solution viscosity in the sonic shear test at 70° C. for 10 minutes.

EXAMPLE X

Using the polymerization system described in Example I, a feed of 1.93 g. $TiCl_3 \cdot \frac{1}{3} AlCl_3$ catalyst, 2.46 ml. diethyl aluminum chloride cocatalyst, 765 ml. cyclohexane diluent, 30 ml. mineral oil, and 199 grams of monomer per hour was used to prepare polymer with a residence time of 3.4 hours, a single cycle monomer conversion of 87 percent and a catalyst efficiency of 88 grams polymer/g. catalyst. The monomer feed composition was (weight per cent) propylene, 47.5%, butene-1, 47.5% and octene-1, 5%. The polymerization was carried out at a temperature of 100–106° C. and a pressure of 195–220 p.s.i.g. Under these conditions there existed a sizable vapor space at the top of the autoclave containing a sizable portion of the propylene feed. The concentration of propylene seen by the catalyst was considerably less than that added in the monomer feed. The polymer isolated had a chemical composition seen by infrared of propylene 34.6%, butene 55.4% and octene 10.0%. It contained 0.7 percent material insoluble in heptane and had an intrinsic viscosity of 1.33. The relative X-ray crystallinity of this polymer was 35%.

A 20% by weight concentrate in CS55/60 naphthenic oil had a solution viscosity at 60° C. of 37,000 centipoises.

A 1.50 percent solution of polymer in TL5499 gave a clear solution at room temperature and a 210° F. viscosity of 10.85 centistokes. This is a viscosity index efficiency of 1.23 and a viscosity index of 145. The viscosity loss in the sonic shear test was 32%.

EXAMPLE XI

Example X was repeated with a feed of 2.2 g. $TiCl_3 \cdot \frac{1}{3} AlCl_3$ catalyst, 2.26 ml. diethyl aluminum chloride cocatalyst, 820 ml. of n-heptane diluent, 33 ml. mineral oil and 372 g. of monomer per hour. The monomer feed composition, by weight, was propylene 45%, butene-1 45% and octene 10%. The polymerization was carried out with a residence time of 2.6 hours, a single cycle monomer conversion of 45% and a catalyst efficiency of 75 g. polymer/g. catalyst. The temperature of polymerization was 100–103° C. and the pressure was 252–258 p.s.ig. The polymer prepared had an average chemical composition, by weight of propylene 60%, butene 27.5% and octene 12.6%. It had an intrinsic viscosity of 1.17 and an X-ray crystallinity of 35%. Some 4.8% of the polymer was insoluble in heptane at 60° C.

A 1.3 percent solution of polymer in TL5499 was clear at room temperature and gave a 210° F. solution viscosity of 11.03 centistokes. This is equivalent to a viscosity index efficiency of 1.48 and a viscosity index of 148. The viscosity loss in the sonic shear test of this solution for 10 minutes at 70° C. was 36%.

The polymer prepared here was compared with various commercial viscosity index improvers in a number of different base oils. In all cases the polymer of this example was equivalent or better than the competitive commerical products in viscosity index efficiency.

EXAMPLE XII

Example I was repeated in detail except that the monomer feed of 305 grams per hour consisted of recycled monomers plus fresh monomers needed to bring the monomer feed composition to propylene 42%, butene-1 46% and $C_{12-16}$ alpha-olefin 12% by weight. Thus, per hour, some 104 g. of polymer was formed having a composition of propylene 66%, butene 27% and $C_{12-16}$ alpha-olefin 7% by weight. The unreacted monomer was essentially quantitatively recovered (98%) to yield 58.5 g. of propylene, 110 g. of butene-1 and 28.7 g. of $C_{12-16}$ alpha-olefin which were returned to the monomer storage tank where additional amounts of fresh propylene 69.6 g., butene-1 30.3 g. and $C_{12-16}$ alpha-olefin 7.9 g. were added. The polymer made was identical to that produced in Example I. The recycling of recovered unreacted monomers was continuous throughout the course of the run.

EXAMPLE XIII

A slurry of $TiCl_3 \cdot \frac{1}{3} AlCl_3$ and diethyl aluminum chloride in dry cyclohexane was cycled through a closed loop for 16 hours with a $C_{6-10}$ alpha-olefin under a nitrogen atmosphere to enhance its activity.

The activated catalyst was then added to a 10 gal. autoclave under a dry nitrogen atmosphere at a rate of 2.54 g. $TiCl_3 \cdot AlCl_3$, 4.32 ml. diethyl aluminum chloride, 8340 ml. cyclohexane and 2270 g. of monomer per hour. The monomer consisted of 47.7% propylene, 42.3% butene-1 and 10% $C_{6-10}$ alpha-olefin. The addition rate was measured with a calibrated burette. Half the cyclohexane was added with the catalyst and half with the monomers.

The autoclave was fitted with a hot water-steam jacket heater, a pressure gauge, a special stirrer designed to wipe the interior walls of the clave and to agitate very high viscosity fluids, several temperature reading devices, two inlets, and an outlet on the top of the clave. The outlet led to a back pressure regulator, and there was a sight glass in the line from the outlet.

In starting up the stirrer was turned on as catalyst was added and the clave was heated to 79.5–80.5° C. After the clave was about half full the solution of pre-dried monomers preheated to 80° C. was added. The clave soon became full and the pressure rose to 225–335 p.s.i.g.

The concentration of polymer in the effluent solution increased gradually until a steady state condition existed after some 6–10 hours. The average residence time was 3.06 hours and the monomer conversion 45.0%. The catalyst had an efficiency of 411 g. polymer/g. catalyst. The polymerization was continued at steady state for 55 hours. The chemical composition of the polymer formed was by infrared analysis, by weight percent 64.1% propylene, 32.3% butene and 3.6% $C_{6-10}$ alpha-olefin. The polymer had an intrinsic viscosity of 2.43 (molecular weight of 1,100,000). The polymer had 2.3% insolubles in n-heptane at 60° C.

A 0.7 weight percent solution of this polymer in multigrade TL5499 crankcase oil base gave a clear solution at room temperature with a solution viscosity of 11.88 centistokes at 210° F. This corresponds to a viscosity index efficiency of 1.51 and a viscosity index of 150.

EXAMPLE XIV

Example XIII was essentially repeated using a feed of 3.3 g. $TiCl_3 \cdot \frac{1}{3} AlCl_3$ catalyst, 3.88 ml. triethyl aluminum cocatalyst, 9500 ml. cyclohexane solvent and 1650 g. of monomer per hour. The monomer feed composition was in weight percent 71.5% propylene, 18.5% butene-1 and 10% $C_{6-10}$ alpha-olefin. The polymerization was carried out at a temperature of 100–101° C. and a pressure of 250–270 p.s.i.g. with a residence time of 3.00 hours and a monomer conversion of 51%. The catalyst was activated by $C_{6-10}$ alpha-olefin (5.4 g./liter catalyst slurry) and had an efficiency of 255 g. polymer/g. catalyst. The chemical composition of the polymer formed was by infrared analysis by weight 84.2% propylene, 13% butene-1 and 2.8% $C_{6-10}$ alpha-olefin. The polymer had an intrinsic viscosity of 1.16 (molecular weight 460,000). The polymer had 4.0% insolubles in n-heptane at 60° C.

A 1.2 weight percent solution of this polymer in multigrade TL5499 cranckcase oil base gave a hazy solution at room temperature with a solution viscosity of 10.26 centistokes at 210° F. This corresponds to a viscosity index efficiency of 1.30 and a viscosity index of 143.

EXAMPLE XV

Example XIII was repeated using a feed of 6.7 g. $TiCl_3 \cdot \frac{1}{3} AlCl_3$ catalyst, 8.5 ml. diethyl aluminum chloride cocatalyst, 9400 ml. cyclohexane solvent and 1750 g. of monomer per hour. The monomer feed composition was in weight percent 64% propylene, 26% butene-1 and 10% $C_{14-16}$ alpha-olefin. The polymerization was carried out at a temperature of 79–80° and a pressure of 385–400 p.s.i.g. with a residence time of 3.03 hours and a monomer conversion of 85%. The catalyst was activated with $C_{14-16}$ alpha-olefin (18 g./liter catalyst slurry) and had an efficiency of 223 g. polymer/g. catalyst. The chemical composition of the polymer formed was by infrared analysis by weight percent propylene 69.4%, butene-1 27.2% and $C_{14-16}$ alpha-olefin 3.4%. The polymer had an intrinsic viscosity of 1.70 (molecular weight 665,000) and had 4.6% insolubles in n-heptane at 60° C.

A 1.1 weight percent solution of this polymer in multigrade TL5499 cranckcase base oil gave a nearly clear solution at room temperature with a solution viscosity of 11.00 centistokes at 210° F. This corresponds to a viscosity index efficiency of 1.30 and a viscosity index of 145.

EXAMPLE XVI

Example XIII was repeated with a feed of 5.9 g. $TiCl_3 \cdot \frac{1}{3} AlCl_3$ catalyst, 7.49 g. diethyl aluminum chloride cocatalyst, 9450 ml. cyclohexane solvent and 1800 g. of monomer per hour. The monomer feed composition was in weight percent 39.7% propylene, 50.3% butene-1 and 10% $C_{12-16}$ alpha-olefin. The polymerization was carried out at a temperature of 60–60.5° C. and a pressure of 370–390 p.s.i.g. with a residence time of 3.03 hours and a monomer conversion of 48.5%. The catalyst was activated with $C_{12-16}$ alpha-olefin (12.6 g./liter catalyst slurry) and had an efficiency of 147 g. polymer/g. catalyst. The chemical composition of the polymer formed was by infrared analysis by weight percent 42.8% butene and 3.5% $C_{12-16}$ alpha-olefin. The polymer had an intrinsic viscosity of 4.14 (molecular weight of 2,000,000). The polymer had 1.1% insolubles in n-heptane at 60° C.

A 0.7 weight percent solution of this polymer in multigrade TL5499 crankcase oil base gave a clear solution at room temperature with a solution viscosity of 12.17 centistokes at 210° F. This corresponds to a viscosity index efficiency of 1.48 and a viscosity index of 149.

EXAMPLE XVII

Example XIII was essentially repeated with a feed of 2.56 g. $TiCl_3 \cdot \frac{1}{3} AlCl_3$ catalyst, 3.25 g. diethyl aluminum chloride cocatalyst, 9400 ml. cyclohexane solvent and 1740 g. of monomer per hour. The monomer feed composition was in weight percent 59% propylene, 31% butene-1 and 10% $C_{6-10}$ alpha-olefin. The polymerization was carried out at a temperature of 105–106° C. and a pressure of 242–248 p.s.i.g. with a residence time of 3.07 hours and a monomer conversion of 49.7%. The catalyst was activated with $C_{6-10}$ alpha-olefin (7.2 g./liter catalyst slurry) and had a catalyst efficiency of 340 g. polymer/g. catalyst. The chemical composition of the polymer formed was by infrared analysis by weight percent 26.5% butene and 2.9% $C_{6-10}$ alpha-olefin. The polymer had an intrinsic viscosity of 1.16 (molecular weight of 400,000). The polymer had 3.1% insolubles in n-heptane at 60° C.

A 1.2 weight percent solution of this polymer in multigrade TL5499 crankcase oil base gave nearly clear solution at room temperature with a solution viscosity of 10.71 centistokes at 210° F. This corresponds to a viscosity index efficiency of 1.73 and a viscosity index of 153.

EXAMPLE XVIII

Example XIII was essentially repeated with a feed of 2.67 g. $TiCl_3 \cdot \frac{1}{3} AlCl_3$ catalyst, 3.4 ml. diethyl aluminum chloride cocatalyst, 8400 ml. cyclohexane solvent and 2320 g. of monomer per hour. The monomer feed composition was in weight percent 43% propylene and 57% butene-1. The polymerization was carried out at a temperature of 79–81° C. and a pressure of 235–240 p.s.i.g. with a residence time of 3.06 hours and a monomer conversion of 40.0%. The catalyst was activated with $C_{6-10}$ alpha-olefin (8.1 g./liter catalyst slurry) and had an efficiency of 346 g. polymer/g. catalyst. The chemical composition of the polymer formed was by infrared analysis by weight propylene 51.7% and butene-1 49.3%. The polymer had an intrinsic viscosity of 2.61 (molecular weight of 1,200,000). The polymer had 0.7% insolubles in n-heptane at 60° C.

A 0.8 weight percent solution of this polymer in multigrade TL5499 crankcase oil base gave a clear solution at room temperature with a solution viscosity of 11.51 centistokes at 210° F. This corresponds to a viscosity index efficiency of 1.51 and a viscosity index of 149.

EXAMPLE XIX

Example XIII was essentially repeated with a feed of 1.02 g. TiCl$_3$·⅓ AlCl$_3$ catalyst, 1.12 ml. triethyl aluminum cocatalyst, 8140 ml. cyclohexane solvent and 2280 g. of monomer per hour. The monomer feed composition was in weight per cent 55.4% propylene, 34.6% butene-1 and 10% C$_{6-10}$ alpha-olefin. The polymerization was carried out at a temperature of 79.5–80.5° C. and a pressure of 236 p.s.i.g. with a residence time of 3.13 hours and a monomer conversion of 44.1%. The catalyst was activated with C$_{6-10}$ alpha-olefin (5.4 g./liter catalyst slurry) and had an efficiency of 988 g. polymer/g. catalyst. The chemical composition of the polymer formed was by infrared analysis by weight 71.7% propylene, 25.5% butene-1 and 2.8% C$_{6-10}$ alpha-olefin. The polymer had an intrinsic viscosity of 3.13 (molecular weight 1,330,000). The polymer had 2.2% insolubles in n-heptane and an X-ray crystallinity of 30%.

A 0.65 weight percent solution of this polymer in multigrade TL5499 crankcase oil base gave a clear solution at room temperature with a solution viscosity of 11.59 centistokes at 210° F. This corresponds to a viscosity index efficiency of 1.45 and a viscosity index of 148.

EXAMPLE XX

Example XIII was essentially repeated using a feed of 1.7 g. of VCl$_3$ catalyst, 2.91 ml. triethyl aluminum cocatalyst, 8360 ml. cyclohexane solvent and 2300 g. of monomer per hour. The monomer feed composition was in weight percent 47.7% propylene, 42.3% butene-1 and 10% C$_{6-10}$ alpha-olefin. The polymerization was carried out at a temperature of 79–81.5° C. and a pressure of 235–250 p.s.i.g. with a residence time of 3.07 hours and a monomer conversion of 45%. The catalyst was activated with C$_{6-10}$ alpha-olefin (5.4 g./liter catalyst slurry) and had an efficiency of 600 g. polymer/g. catalyst. The chemical composition of the polymer formed was by infrared analysis by weight 67.1% propylene, 31.9% butene-1 and 1.0% C$_{6-10}$ alpha-olefin. The polymer had an intrinsic viscosity of 4.74 (molecular weight 2,950,000). The polymer had 2.4% insolubles in n-heptane at 60° C.

A 0.5 weight percent solution of this polymer in multigrade TL5499 crankcase base oil gave a clear solution at room temperature with a solution viscosity of 12.02 centistokes at 210° F. This corresponds to a viscosity index efficiency of 1.27 and a viscosity index of 145.

EXAMPLE XXI

To a slurry of 9.8 g. of TiCl$_3$·⅓ AlCl$_3$ in 9.5 liters of cyclohexane, predried over silica gel, containing 12.42 ml. of diethyl aluminum chloride, was added 42.75 g. of C$_{12-16}$ alpha-olefin. This mixture was circulated through a closed loop for 16 hours under a nitrogen atmosphere using a diaphragm pump. The activity of the titanium trichloride catalyst was greatly enhanced by the action of the C$_{12-16}$ alpha-olefin resulting in higher catalyst efficiency. The activated catalyst slurry was then added to a one-gallon autoclave under a dry nitrogen atmosphere at a rate, per hour, of 0.49 g. TiCl$_3$·⅓ AlCl$_3$ catalyst, 0.621 g. diethyl aluminum chloride cocatalyst, and 475 ml. of cyclohexane with 4.5 g. of C$_{12-16}$ alpha-olefin per liter of catalyst slurry. The addition rate was measured using a calibrated burette. Half the cyclohexane solvent was normally added with the catalyst. The remainder was added with the monomers as described below. The autoclave was fitted with an electric jacket heater, a pressure gauge, turbine stirrer, two inlet tubes reaching to near the stirrer—one for catalyst addition and the other for monomer addition, a thermocouple and an outlet in the lid of the clave. The outlet led to a back pressure regulator which could be set for any desired pressure. The stirrer in the clave was turned on as catalyst was added and the clave was heated to 80° C. After the clave was approximately half full, a solution of predried monomers propene, butene-1 and C$_{12-16}$ alpha-olefins, in predried cyclohexane, was added at a rate of 310 g. monomers and 475 ml. of cyclohexane per hour. Again the addition rate was measured accurately using a calibrated burette. Hydrogen was added with the monomer stream at a rate of 0.0065 gram moles per hour as a molecular weight control agent throughout the polymerization. The hydrogen was metered in continuously by displacing hydrogen from a closed cylinder by pumping in a known volume of oil. The oil added to the cylinder was measured using a calibrated burette. The monomer ratio was, in weight percent, propylene 40%, butene-1 48% and C$_{12-16}$ alpha-olefin 12%. The clave soon became full and the pressure rose to 635 p.s.i.g. as set by the back pressure regulator. The concentration of polymer in the effluent cyclohexane solution gradually increased until a steady state condition existed in the polymerization reactor after some 6 hours of operation. Polymerization was then run under steady state conditions for 10 hours at 80° C. with an average residence time of 2.66 hours and with a monomer conversion of 38.1%. On this basis the catalyst efficiency was 184 g. polymer/g. catalyst. The effluent polymer solution containing still active catalyst as seen by the pinkish purple color was treated with a small amount of methanol to discharge the color and deactivate the residual catalyst. The cyclohexane solution was then diluted with isopropanol to precipitate the polymer. The isolated polymer was carefully washed with methanol and vacuum dried. Infrared analysis of the product indicated a chemical composition of (in weight percent) propylene 44.6%, butene-1 45.9% and C$_{12-16}$ alpha-olefin 9.5%. The polymer had an intrinsic viscosity of 0.99 dl./g. indicating a viscosity average molecular weight of 320,000.

A solution of one part of this polymer dissolved in four parts of 55/60 S.U.S. naphthenic oil (Cities Service) had a viscosity of 20,000 cps. at 60° C.

The 20% concentrate was added to a multigrade crankcase oil (Texaco TL5499) to give a 1.5 weight percent polymer solution. The resulting oil with additive was essentially clear at room temperature having a viscosity index of 142. From this it was calculated that the polymer has a viscosity index efficiency of 1.20.

EXAMPLE XXII

Example XXI was essentially repeated with a feed of 0.529 g. TiCl$_3$·⅓ AlCl$_3$ catalyst, 0.67 ml. diethyl aluminum chloride cocatalyst, 1100 ml. cyclohexane solvent, 260 g. monomer and 0.01 g. mol of hydrogen per hour. The monomer feed composition was, by weight, 46% propylene, 48% butene-1 and 6% octene-1. The polymerization was carred out at a temperature of 78–83° C. and a pressure of 340 p.s.i.g. with a residence time of 2.54 hours and a monomer conversion of 24.2%. The catalyst was activated with octene-1 (1.33 g./liter catalyst slurry) and had an efficiency of 108 g. polymer/g. catalyst. The polymerization was continued at steady state for 18 hours. The chemical composition of the polymer formed was, by infrared analysis, by weight, 64.4% propylene, 32.9% butene-1 and 2.7% octene-1. The polymer had an intrinsic viscosity of 0.65 dl./g. indicating a viscosity average molecular weight of 180,000.

To the cyclohexane solution separated from the deactivator was added sufficient 55/60 S.U.S. naphthenic oil (Cities Service) to prepare a final 20% concentrate of polymer in said oil. This solution was filtered to remove a small amount of insolubles and was then transferred to a distallation vessel. A sample of polymer isolated from this filtered solution showed no insolubles in n-heptane at 60° C.

Cyclohexane diluent was then distilled off to yield the 20% by weight concentrate which had a viscosity of 11,000 cps. at 60° C. This final product was removed from the vessel and transferred to storage.

The addition of 125 parts of this 20% concentrate to 875 parts of a multigrade crankcase base oil (Texaco TL5499) gave a clear oil at room temperature having a viscosity index of 140. From this it was calculated that the polymer has a viscosity index efficiency of 1.20.

EXAMPLE XXIII

Example XXI was repeated using a feed of 0.49 g. $TiCl_3 \cdot \frac{1}{3}$ $AlCl_3$ catalyst, 0.622 ml. diethyl aluminum chloride cocatalyst, 960 ml. cyclohexane solvent, 312 g. monomer and 0.008 g. mol of hydrogen per hour. The monomer feed composition was in weight percent 40% propylene, 48% butene-1 and 12% $C_{12-16}$ alyha-olefin. The polymerization was carried out at a temperature of 80° C. and a pressure of 635 p.s.i.g. with a residence time of 2.62 hours and a monomer conversion of 39.9%. The catalyst was activated with $C_{12-16}$ alpha-olefin (4.5 g./liter catalyst slurry) and had an efficiency of 187 g. polymer/g. catalyst. The polymerization was continued at steady state conditions for 13.5 hours. The chemical composition of the polymer formed was by infrared analysis by weight percent 51.0% propylene, 43.3% butene-1 and 5.7% $C_{12-16}$ alpha-olefin. The polymer had an intrinsic viscosity of 0.89 dl./g. (molecular weight of 280,000). All heptane insolubles were removed by filtration as in Example XXII.

The 20 weight percent solution of this polymer in CS 55/60 naphthenic oil had a viscosity of 18,000 centipoises at 60° C.

A 1.9 weight percent solution of this polymer in multigrade crankcase base oil (Texaco TL5499) gave a clear solution at room temperature having a viscosity index of 144. This corresponds to a viscosity index efficiency for the polymer of 1.25.

EXAMPLE XXIV

The polymerization was scaled up in a 10-gallon autoclave system, but otherwise was essentially the same as described in Example XXI. A feed of 2.44 g. $TiCl_3 \cdot \frac{1}{3}$ $AlCl_3$ catalyst, 3.1 ml. diethyl aluminum chloride cocatalyst, 8550 ml. cyclohexane solvent, 2340 g. monomer and 0.08 g. mol hydrogen per hour was used. The monomer feed composition 47.7% propylene, 42.3% butene-1, 5% $C_{6-10}$ alpha-olefin and 5% $C_{14-18}$ alpha-olefin. The polymerization was carried out at a temperature of 79–82° C. and a pressure of 230–235 p.s.i.g. with a residence time of 3.04 hours and a monomer conversion of 44.1%. The catalyst was activated with the $C_{6-10}/C_{14-18}$ alpha-olefin (3.6 g./3.6 g./liter catalyst slurry and had an efficiency of 422 g. polymer/g. catalyst. The polymerization was carried out at steady state conditions for 24.5 hours. The chemical composition of the polymer formed was by infrared analysis by weight percent 66% propylene, 31% butene-1 and 2.7% $C_{6-10/14-18}$ alpha-olefin. The polymer had an intrinsic viscosity of 0.81 dl./g. (molecular weight of 240,000). The polymer had 6.1% insolubles in n-heptane at 60° C.

A 1.8 weight percent of this original polymer in multigrade crankcase oil (Texaco 5499) gave a hazy solution at room temperature having a viscosity index of 141. It was calculated that the polymer had a viscosity index efficiency of 1.26.

Removal of the heptane insolubles to under 0.5% as described in Example XXII gave a polymer material which, when dissolved as a 20 weight percent concentrate in CS 55/60 naphthenic oil (Cities Service) had a viscosity of 14,000 centipoises at 60° C. This solution is readily flowable.

A 2.0 weight percent solution of this filtered polymer in multigrade crankcase oil (Texaco TL–5499) gave a clear solution at room temperature having a viscosity index of 140. This corresponds to a viscosity index efficiency of 1.18 for the polymer. The loss of viscosity after some shearing was only 22% for this solution.

What is claimed is:

1. A method for making a viscosity index improver for lubricating oils which comprises simultaneously feeding into a reaction zone at a constant rate:
   (a) a first ethylenically unsaturated monomer having between 3 and about 25 carbon atoms,
   (b) a second ethylenically unsaturated monomer having between 3 and about 25 carbon atoms and different from said first monomer,
   (c) a third ethylenically unsaturated monomer having between 3 and about 25 carbon atoms and different from said first and second monomers,
   (d) a diluent, and
   (e) a Ziegler catalyst consisting essentially of an (i) organo-metallic compound or a metal hydride and (ii) a compound selected from the group consisting of vanadium tetrachloride, vanadium trichloride, vanadyl trichloride, titanium trichloride, titanium tetrachloride, titanium tetrafluoride and tungsten hexachloride;

copolymerizing said monomers in said zone, and continuously withdrawing a product stream containing polymer and unreacted monomer from said zone at a rate such as to maintain a mass balance between monomer fed to said zone and monomer and polymer withdrawn therefrom.

2. The method claimed in claim 1 wherein the reaction zone is maintained at a pressure between about atmospheric and about 3000 p.s.i.g.

3. The method claimed in claim 1 wherein the reaction zone is maintained at a temperature between about 20 and about 200° C.

4. The method claimed in claim 1 wherein the average residence time in the reaction zone is sufficient to convert between about 5 and about 90% of the monomers to polymer.

5. The method claimed in claim 1 wherein the average residence time in the reaction zone is between about 0.5 and about 6 hours.

6. The method claimed in claim 1 and comprising supplying between about 0.0001 and about 0.004 mol of hydrogen to the reaction zone, per mol of monomer.

7. A method for making a viscosity index improving lubricating oil additive which comprises simultaneously feeding into a reaction zone at a constant rate:
   (a) propylene
   (b) a second ethylenically unsaturated monomer which is an alpha-olefin having from 4 to 8 carbon atoms
   (c) a third ethylenically unsaturated monomer which is an alpha-olefin having from 5 to 25 carbon atoms and of greater molecular weight than said second monomer
   (d) a diluent, and
   (e) a Ziegler catalyst consisting essentially of an (i) organo-metallic compound or a metal hydride and (ii) a compound selected from the group consisting of vanadium tetrachloride, vanadium trichloride, vanadyl trichloride, titanium trichloride, titanium tetrachloride, titanium tetrafluoride and tungsten hexachloride;

copolymerizing said monomers in said zone, and continuously withdrawing a product stream containing polymer and unreacted monomer from said zone at a rate such as to maintain a mass balance between monomer fed to said zone and monomer and polymer withdrawn therefrom.

8. A method for making a viscosity index improving lubricating oil additive which comprises simultaneously feeding into a reaction zone at a constant rate:
   (a) propylene, as a first monomer
   (b) butene-1, as a second monomer
   (c) an alpha-olefin having from 5 to 25 carbon atoms, or a mixture of such alpha olefins, as a third monomer (d) a diluent (e) a Ziegler catalyst consisting essentially of an (i) organo-metallic compound or a metal hydride and (ii) a compound selected from the group consisting of vanadium tetrachloride, vanadium trichloride, vanadyl trichloride, titanium trichloride, titanium tetrachloride, titanium tetrafluoride and tungsten hexachloride;

the proportion of said monomers, based on total monomers fed, being, percent by weight:

| | |
|---|---|
| Propylene | 9–90 |
| Butene-1 | 9–80 |
| $C_5$ to $C_{25}$ alpha olefin | 1–40 | maintaining said zone at a pressure between about atmospheric and about 3000 p.s.i.g. and at a temperature between about 20° C. and about 200° C. to copolymerize said monomers and continuously removing copolymer and unreacted monomer from said reaction zone at a rate such as to maintain a mass balance between monomer fed and monomer and copolymer removed from said zone.

9. The method claimed in claim 8 wherein the proportions of the three monomers, based on total monomers fed, is, percent by weight:

| | |
|---|---|
| Propylene | 19–80 |
| Butene-1 | 19–80 |
| $C_5$–$C_{25}$ olefin | 1–20 |

10. A viscosity index improver comprising a copolymer consisting essentially of chains of residues of at least three different alpha olefins having from 3 to 25 carbon atoms, said chains being characterized in that, on the average, they have the same stereospecific structure and chemical composition at the head and at the tail, and in that sequences of the same chemical composition and stereostructure are arranged along said chains in random fashion, said copolymer having a molecular weight between about 50,000 and about 3,000,000 and an X-ray crystallinity between about 10 and about 50%.

11. The improver claimed in claim 10 wherein the copolymer contains between about 10 and about 90% by weight propylene residues.

12. The improver claimed in claim 1 wherein the copolymer contains in addition to propylene, residues of an alpha olefin having from 4 to 8 carbon atoms.

13. The improver claimed in claim 12 wherein the copolymer contains in addition, a $C_{5-25}$ alpha olefin or a mixture of $C_{5-25}$ alpha olefin residues.

14. The improver claimed in claim 10 wherein the copolymer contains propylene and butene-1 residues.

References Cited

UNITED STATES PATENTS

| | | | |
|---|---|---|---|
| 2,825,721 | 3/1958 | Hogan | 260—88.1 |
| 3,060,120 | 10/1962 | Lippincott | 252—32 |
| 3,464,962 | 9/1969 | Geacintov | 260—88.2 |
| 3,447,957 | 11/1969 | Hall | 252—59 |
| 3,093,624 | 6/1963 | Gresham | 260—88.2 |

JOSEPH L. SCHOFER, Primary Examiner

R. S. BENJAMIN, Assistant Examiner

U.S. Cl.X.R.

252—59